United States Patent
Mayer et al.

(10) Patent No.: US 8,499,609 B2
(45) Date of Patent: Aug. 6, 2013

(54) METHOD AND APPARATUS FOR PROCESSING INDIVIDUAL SENSOR DEVICES

(75) Inventors: Felix Mayer, Stäfa (CH); Markus Graf, Zürich (CH); Dominik Niederberger, Zürich (CH); Martin Fitzi, Stäfa (CH)

(73) Assignee: Sensirion AG, Laubisrutistrasse (*) Notice: Subject to any disclaimer, the term of this patent is extended or adjusted under 35 U.S.C. 154(b) by 574 days.

(21) Appl. No.: 12/798,890

(22) Filed: Apr. 13, 2010

(65) Prior Publication Data

US 2010/0310343 A1    Dec. 9, 2010

(51) Int. Cl.
*G01N 1/28* (2006.01)

(52) U.S. Cl.
USPC ............................................ 73/1.06; 73/1.01

(58) Field of Classification Search
USPC ...................... 73/1.01; 414/222.07
See application file for complete search history.

(56) References Cited

U.S. PATENT DOCUMENTS

| | | | |
|---|---|---|---|
| 3,832,882 A | 9/1974 | Schoen, Jr. | |
| 4,177,667 A | 12/1979 | Rolf et al. | |
| 4,590,789 A | 5/1986 | Kunze | |
| 4,647,432 A * | 3/1987 | Wakatake | 422/64 |
| 4,733,553 A | 3/1988 | Folk et al. | |
| 4,777,716 A | 10/1988 | Folk et al. | |
| 4,825,684 A | 5/1989 | Nishiguchi et al. | |
| 4,973,241 A * | 11/1990 | Keyser | 425/503 |
| 5,267,467 A * | 12/1993 | Caron | 73/1.26 |
| 5,407,501 A | 4/1995 | Koen et al. | |
| 5,604,444 A | 2/1997 | Harwood et al. | |
| 5,646,125 A | 7/1997 | Townsend et al. | |
| 5,804,983 A | 9/1998 | Nakajima et al. | |
| 5,848,122 A | 12/1998 | Kurtz | |
| 5,963,027 A | 10/1999 | Peters | |
| 6,134,941 A | 10/2000 | Cripe et al. | |
| 6,286,363 B1 | 9/2001 | Discenzo | |
| 6,359,253 B1 | 3/2002 | Sritulanont et al. | |
| 6,418,783 B2 | 7/2002 | Sunshine et al. | |
| 6,688,156 B2 | 2/2004 | Dietrich et al. | |
| 6,690,569 B1 | 2/2004 | Mayer et al. | |
| 6,750,522 B1 | 6/2004 | Mayer et al. | |
| 6,769,285 B2 | 8/2004 | Schneider et al. | |
| 7,281,405 B2 | 10/2007 | Mayer et al. | |
| 2004/0108847 A1 | 6/2004 | Stoll et al. | |
| 2004/0256959 A1 | 12/2004 | Ladabaum | |
| 2006/0145711 A1 | 7/2006 | Honma | |
| 2008/0307858 A1 * | 12/2008 | McManus et al. | 73/40.7 |

FOREIGN PATENT DOCUMENTS

| | | |
|---|---|---|
| JP | 10160597 | 6/1998 |
| WO | WO 9904276 | 1/1999 |
| WO | 99/46572 | 9/1999 |
| WO | WO 02101348 | 12/2002 |

* cited by examiner

*Primary Examiner* — Hezron E Williams
*Assistant Examiner* — Mark A Shabman
(74) *Attorney, Agent, or Firm* — Cooper & Dunham LLP

(57) ABSTRACT

To process a plurality of sensor devices, such as humidity sensors or gas sensors, the sensor devices are run through a testing station and a turret handler. In order to increase throughput of the testing station, several test cycles are operated simultaneously in a phase-shifted manner. The sensor devices are e.g. sequentially fed onto trays of the test station, on which they are assembled in batches. Each batch is subjected to a test cycle. After the test cycle, the sensor devices of a batch are sequentially fed back to the turret handler.

12 Claims, 2 Drawing Sheets

METHOD AND APPARATUS FOR PROCESSING INDIVIDUAL SENSOR DEVICES

CROSS REFERENCE TO RELATED APPLICATIONS

This application claims the priority of European Patent Application EP09007394, filed Jun. 4, 2009, the disclosure of which is incorporated herein by reference in its entirety.

BACKGROUND OF THE INVENTION

The invention relates to a method and an apparatus for handling a plurality of sensor devices and running them through a testing station.

A "turret handler", also called "turret test handler" is an apparatus adapted to sequentially carry electronic devices through several handling locations, where the devices are e.g. positioned, inspected, tested, marked, rejected, and finally ejected for final packaging and shipping. Each handling station handles a single device at a time.

Turret handlers are also used for handling integrated sensor devices. They are, however, poorly suited for testing sensor devices because, if the sensor devices are not only to be tested electrically but also in view of their sensing properties, a test typically takes a comparatively long time and therefore reduces the throughput of the turret handler.

SUMMARY OF THE INVENTION

It is therefore desired to provide a method and an apparatus for processing sensor devices which offer a good throughput.

According to a first aspect of the present invention there is provided an apparatus according to claim 1. According to a second aspect of the present invention there is provided a method according to claim 6. Accordingly, the apparatus comprises a turret handler, a testing station and a handling device.

The turret handler is structured and adapted to sequentially transport the individual sensors through several handling locations.

The testing station comprises several test chambers, with each test chamber providing room for a batch of several sensor devices at a time. Each chamber is structured and adapted to test the sensor devices in a test cycle. In an embodiment, such a test cycle can e.g. comprise the introduction of a batch of sensor devices into a test environment in a chamber, the stabilization of the test environment, a test measurement carried out on the sensor devices, as well as the removal of the sensor devices from the test environment. The testing station is structured and adapted to run parallel test cycles in the several test chambers in a phase-shifted manner, i.e. the test cycles in the test chambers may be substantially identical, but while one of them may start, another one may have already started some time ago and may still be running, a third one may have started an even longer time ago, etc.

The handling device is structured and adapted for sequentially transporting individual sensor devices from the testing station to the turret handler.

Hence, batches of several sensor devices can be introduced into the test chambers. Phase-shifted test cycles are run in the test chambers. After having run through a test cycle, the individual sensor devices of a batch are transported sequentially to the turret handler where they are moved, again sequentially, through several handling locations.

This scheme allows to run several test cycles in parallel and to maintain a continuous sequential stream of sensor devices from the testing station to the turret handler, while still allowing the individual test cycles as well as the loading/unloading process to be slower than the processing rate of the turret handler.

The sensor devices can either pass the testing station prior to being placed in the turret handler, or the testing station can form a handling station of the turret handler.

In the first case, prior to placing the sensor devices in the turret handler, they may be transported from a feed station to the testing station and, subsequently, they may be individually and sequentially transported from the testing station to the turret handler.

In the second case, individual sensor devices from the turret handler may be sequentially transported to the testing station, where they are submitted to their test cycle. Then, the individual sensor devices may be sequentially transported back from the testing station to the turret handler.

In an advantageous embodiment, the apparatus and the method are applied to the handling of sensor devices comprising humidity sensors, temperature sensors, flow sensors, gas sensors or pressure sensors as such sensors inherently take considerable time for testing. In the test chambers, such sensor devices may be exposed to a given humidity, temperature, gas composition, flow or pressure respectively.

Other advantageous embodiments are listed in the dependent claims as well as in the description below. The embodiments similarly pertain to the apparatus and the method. Further on it shall be noted that all embodiments of the present invention concerning a method might be carried out with the order of the steps as described, nevertheless this has not to be the only essential order of the steps of the method all different orders of orders and combinations of the method steps are herewith described.

BRIEF DESCRIPTION OF THE DRAWINGS

The aspects defined above and further aspects, features and advantages of the present invention can also be derived from the examples of embodiments to be described hereinafter and are explained with reference to examples of embodiments. The invention will be described in more detail hereinafter with reference of examples of embodiments but to which the invention is not limited.

DETAILED DESCRIPTION OF THE INVENTION

Figure 1:
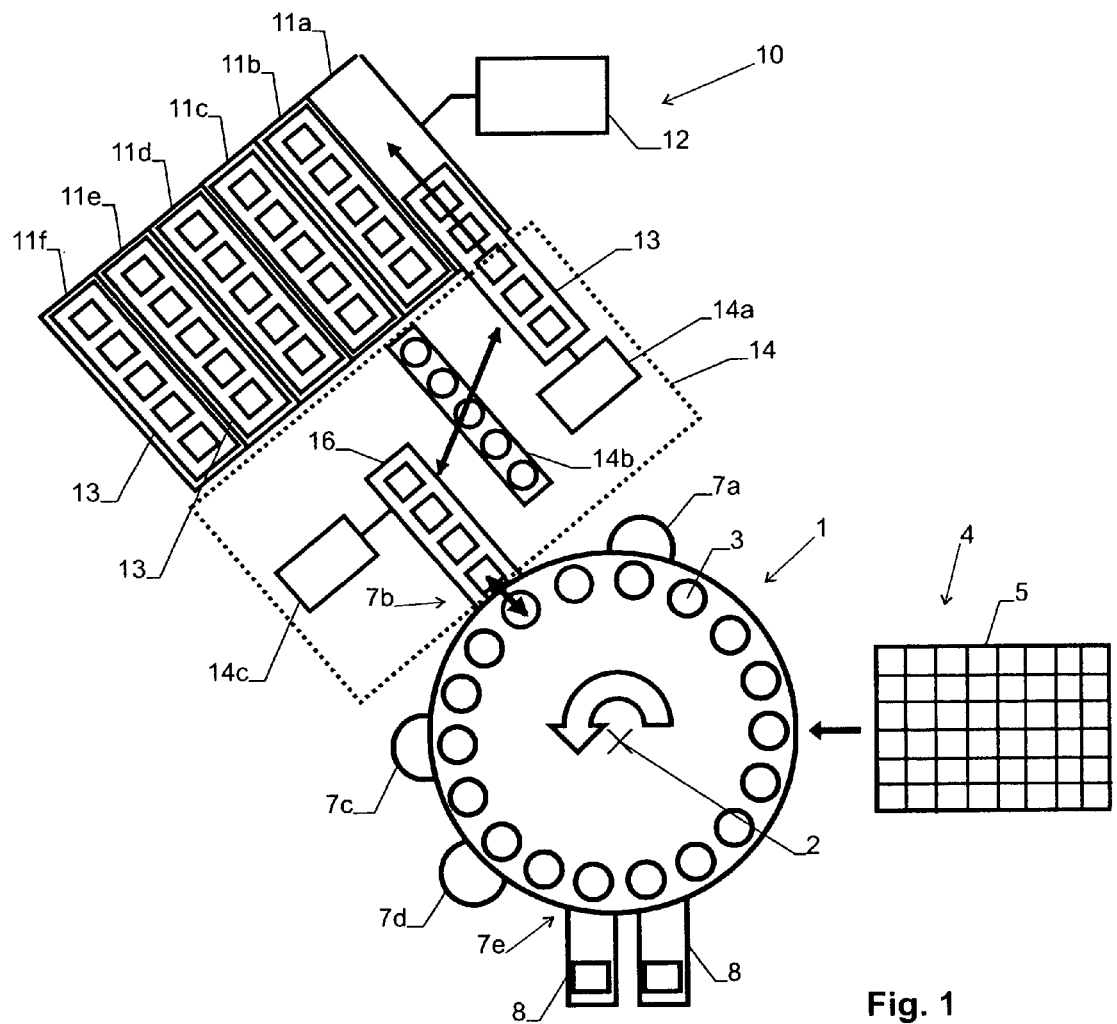
FIG. 1 shows an apparatus for carrying out a first embodiment of the invention and FIG. 2 shows an apparatus for carrying out a second embodiment of the invention.

The apparatus according to the first embodiment of the invention, as shown in FIG. 1, comprises a turret handler 1, which can e.g. be formed by a circular turret driven for rotation about a vertical axis 2. Turret handler 1 comprises a plurality of positions 3 for receiving sensor devices. Such positions can e.g. be formed by vacuum chucks arranged at the bottom side of the turret, which hold the sensor devices in a suspended position.

The apparatus further comprises a feed station 4 for feeding sensor devices to turret handler 1. The sensor devices are e.g. fed to feed station 4 in batches 5 on a wafer frame. The sensor devices are already packaged in their plastics housing and separated into individual units.

Vacuum chucks at the positions 3 are used to take up one sensor device at a time. After taking up each sensor device, turret handler 1 rotates by one location, whereupon the next sensor device is deposited in the next position 3.

Once positioned on turret handler 1, the sensor devices are sequentially transported through several handling locations 7a, 7b, 7c, 7d, 7e, which e.g. can be adapted and structured to perform one or more of the following tasks:

- optically checking a sensor device, e.g. by means of a camera and image processing,
- centering and properly orienting a sensor device in its position 3,
- electrically contacting a sensor device for electrical tests,
- rejecting sensor devices that have been found to fail,
- feeding tested sensor devices to further equipment 8 for packaging (e.g. on reels) and shipping.

As can be seen in FIG. 1, the apparatus is further provided with a testing station 10. Testing station 10 comprises several test chambers 11a-11f. Each test chamber can be hermetically sealed and provides room for a batch of several, e.g. 20, sensor devices. In addition, a climate control unit 12 is provided for generating an environment of predefined properties in each chamber, e.g. an environment of defined temperature and gas composition, of defined pressure and/or of defined flow.

In addition to this, a handling device 14 is provided for transporting sensor devices to/from testing station 10.

Testing station 10 comprises a plurality of trays 13, each of which offers room for several sensor devices. Handling device 14 comprises at least one manipulator, schematically shown under reference numeral 14a, for inserting and removing the trays 13 to/from the test chambers 11a-11f. Handling device 14 further comprises a gripper 14b, which e.g. consists of an array of vacuum chucks for simultaneously transferring a batch of the sensor devices between one of the trays 13 and a carrier 16. Carrier 16 can be moved in respect to turret handler 1, e.g. by means of a linear drive 14c.

The trays 13 as well as carrier 16 advantageously both provide room for receiving a plurality of sensor devices in a single row.

Operation of the apparatus of FIG. 1 is as follows:

As mentioned, sensor devices are sequentially fed to the positions 3 of turret handler 1. Following the rotation of turret handler 1, they arrive at the first handling location 7a, which may e.g. be an optical test location where the presence, orientation and position of each sensor device are tested and, if necessary, where the orientation and/or position are corrected.

At the same time, at handling location 7b, a tested sensor device is taken up from carrier 16, which guarantees that a free location is available on carrier 16.

Now, turret handler 1 is rotated and the sensor device that was previously at handling location 7a arrives at handling location 7b, where it is unloaded onto carrier 16 at the free position created in the previous step. Carrier 16 is then offset by means of drive 14c such that turret handler 1 can take up a next tested sensor device from carrier 16.

This procedure is repeated until carrier 16 carries untested sensor devices only. Then, gripper 14b simultaneously takes up all sensor devices from carrier 16 and deposits them on a free tray 13, subsequently called the "first tray", and the sensor devices on the first tray are called the "first batch".

In a next step, gripper 14b takes up tested sensor devices from a next tray, subsequently called the "second tray" and deposits them on carrier 16. Carrier 16 is moved below turret handler 1 such that a first tested sensor device can be loaded by turret handler 1.

At the same time, the first tray is inserted into a free test chamber 11a-11f, where a testing cycle begins.

Now, as it has previously been described for the first batch of sensor devices, the tested sensors on carrier 16 are replaced by a second batch of untested sensor devices.

Once the second batch of sensor devices is on carrier 16, it is transferred by gripper 14b onto the second tray. A third tray with tested sensor devices is unloaded from a test chamber and the tested sensor devices are transferred onto carrier 16.

The second tray is inserted into a next free testing chamber and, while the test cycle for the first tray is still in progress, the test cycle for the second tray is started.

This procedure is repeated until the test cycle for the first tray is ended. Then, the first tray is extracted from its chamber and all the sensor devices of the first batch are simultaneously transferred onto carrier 16 by gripper 14b in the manner described above.

The tested sensor devices of the first batch are then sequentially transferred from carrier 16 to turret handler 1, where they are sequentially and individually moved through subsequent handling stations, e.g. a location 17c for laser marking and a location 17d for ejecting rejected sensor devices. The non-rejected sensor devices arrive at handling station 17e, from where they are fed to equipment 8 for packaging and shipping.

In the embodiment of FIG. 1, the individual sensor devices are sequentially transported from turret handler 1 to testing station 10. After testing, they are again individually and sequentially transported back from testing station 10 to turret handler 1.

Figure 2:
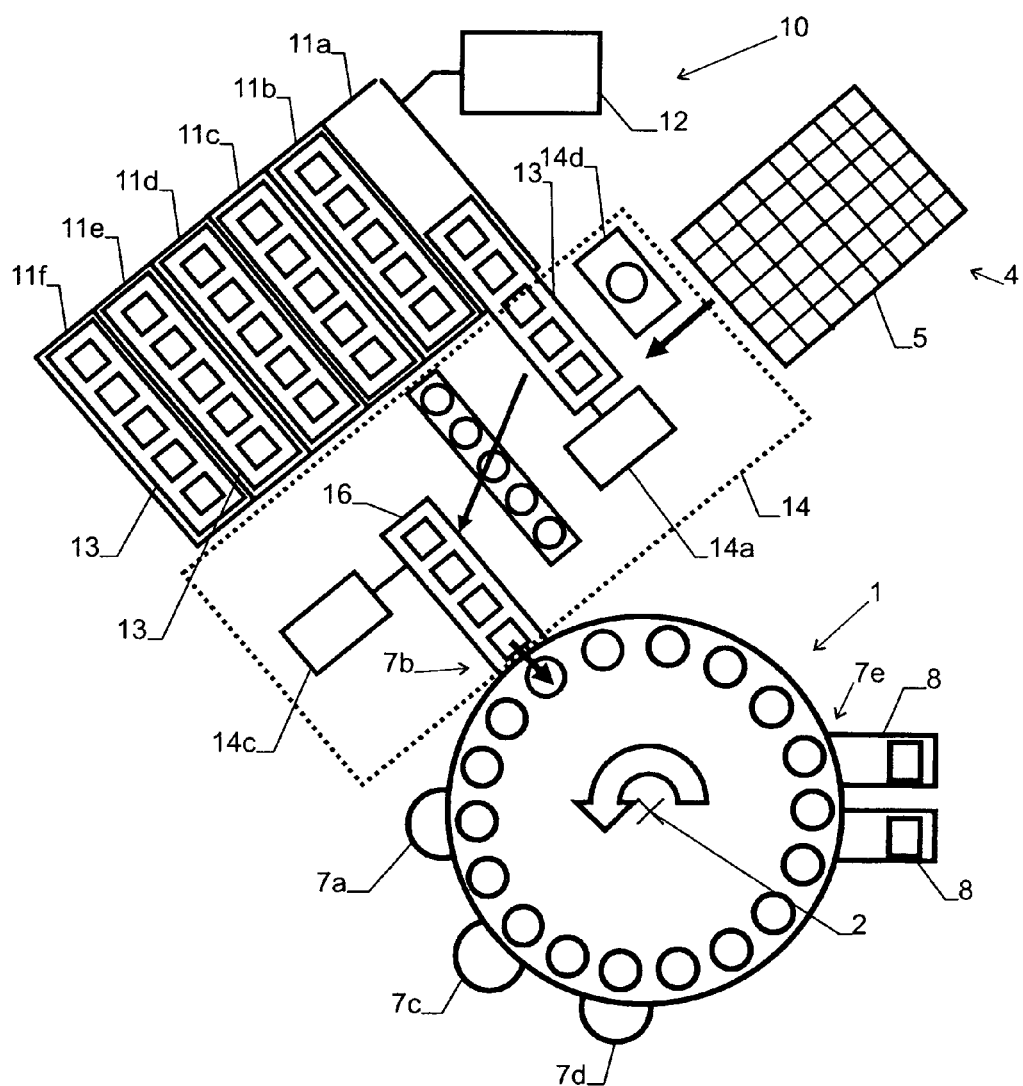

FIG. 2 shows a different scheme of operation, where, prior to placing the sensor devices on turret handler 1, the sensor devices are directly transported from feed station 4 to testing station 10 for testing. After testing, the individual sensor devices are transported from testing station 10 to turret handler 1.

This is achieved e.g. by providing handling device 14 with a vacuum chuck 14d, which can be operated to take up sensor devices from an incoming batch 5 and transfer them onto the trays 13. The trays are then again subjected to test cycles, with several phase-shifted test cycles running at the same time. Once the sensor devices on a tray have been fully tested, they are transferred by gripper 14b onto carrier 16, from where they are loaded into turret handler 1.

In both embodiments, the phase shifted use of several parallel test cycles allows to increase throughput of the testing station 10 and to maintain a steady, continuous feed of tested devices form/to turret handler 1. As mentioned, this is especially advantageous for testing sensor devices that have to be subjected to an environment that cannot be set up quickly, e.g. because its temperature, pressure humidity or gas composition has to be set to predefined parameters, which is inherently time consuming.

In the embodiments above, trays 13 and a separate carrier 16 have been used. Alternatively, carrier 16 can be dispensed with if the whole trays 13 are transported between handling location 7b and the chambers 11a-11f.

In the above examples, a batch of sensor devices is brought into a single test chamber 11a-11f during a test cycle. Alternatively, the batch of sensor devices can pass several test chambers during its test cycle. For example, chambers 11a, 11c, 11e may be at a first temperature and chambers 11b, 11d and 11f at a second temperature. In that case, a batch may e.g. first be placed in chamber 11a, and then in chamber 11b, whereafter it is transported back to handling location 7b. At the same time, two other batches are processed in chambers 11c, 11d and 11e, 11f, respectively, in phase shifted manner. In this way, several tests under different conditions can be run during the test cycle of each batch, without any need to change the environmental conditions in the individual test chambers.

The invention claimed is:

1. An apparatus for processing individual sensor devices comprising
    a turret handler structured and adapted for sequentially transporting individual sensor devices through several handling locations,
    a testing station comprising several test chambers, each test chamber providing room for a batch of several sensor devices and being structured and adapted for testing said batch in a test cycle, and
       the testing station being structured and adapted for running parallel, phase-shifted test cycles in the several test chambers, and
    a handling device structured and adapted for sequentially transporting individual sensor devices from said testing station to said turret handler.

2. The apparatus of claim 1 further comprising a plurality of trays, with each tray providing room for several sensor devices, wherein the handling device is structured for inserting and removing the trays from a test chamber and for loading and unloading sensor devices onto and from the trays.

3. The apparatus of claim 2 further comprising a carrier providing room for several sensor devices, wherein the handling device comprises a gripper structured for simultaneously transferring all the sensor devices between one of said trays and said carrier.

4. The apparatus of claim 2 wherein said trays are structured for receiving said sensor devices in a single row.

5. The apparatus of claim 1 wherein said handling device is structured and adapted for sequentially transporting individual sensor devices from the said turret handler to said testing station and from said testing station to said turret handler.

6. A method for processing individual sensor devices comprising the steps of
    testing said sensor devices in a testing station by introducing batches of several sensor devices into several test chambers and running parallel, phase-shifted test cycles,
    sequentially transporting individual sensor devices from said testing station to a turret handler, and
    moving the individual sensor devices, by means of said turret handler, through several handling locations.

7. The method of claim 6 wherein, for testing said sensor devices in said testing station, a single batch of sensor devices is placed on a tray,
    inserted into one of said test chambers,
    subjected to one of said test cycles, and
    removed with said tray from said test chamber,
    whereupon the sensor devices of said batch are individually and sequentially fed to said turret handler.

8. The method of claim 7 comprising the steps of simultaneously transferring all the sensor devices of a batch from said tray to a carrier and individually and sequentially transferring all the sensor devices of the batch from said carrier to said turret handler.

9. The method of claim 6 comprising the steps of
    sequentially transporting individual sensor devices from said turret handler to said testing station,
    submitting said sensor devices to said test cycles in said testing station, and
    sequentially transporting individual sensor devices from said testing station to said turret handler.

10. The method of claim 6 comprising the steps of prior to placing said sensor devices in said turret handler,
    transporting said sensor devices from a feed station to said testing station and, subsequently,
    submitting said sensor devices to said test cycles in said testing station, and sequentially transporting individual sensor devices from said testing station to said turret handler.

11. The method of claim 6 wherein said sensor devices comprise one of humidity sensors, temperature sensors, gas sensors, flow sensors or pressure sensors, and
    wherein, in said test chambers, said sensor devices are exposed to one of a given humidity, temperature, gas composition or pressure respectively.

12. The method of claim 6, wherein, during a test cycle, a batch of sensor devices passes several test chambers.

* * * * *